United States Patent
Osotio et al.

(10) Patent No.: US 10,621,248 B2
(45) Date of Patent: Apr. 14, 2020

(54) COLLABORATIVE REAL-TIME DATA MODELING

(71) Applicant: MICROSOFT TECHNOLOGY LICENSING, LLC, Redmond, WA (US)

(72) Inventors: Neal Timothy Osotio, Sammamish, WA (US); Angela L. Moulden, Ravensdale, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 880 days.

(21) Appl. No.: 15/170,461

(22) Filed: Jun. 1, 2016

(65) Prior Publication Data

US 2017/0351764 A1 Dec. 7, 2017

(51) Int. Cl.
| G06F 17/30 | (2006.01) |
| G06F 16/9535 | (2019.01) |
| G06F 16/26 | (2019.01) |
| G06F 16/248 | (2019.01) |

(52) U.S. Cl.
CPC ........ G06F 16/9535 (2019.01); G06F 16/248 (2019.01); G06F 16/26 (2019.01)

(58) Field of Classification Search
None
See application file for complete search history.

(56) References Cited

U.S. PATENT DOCUMENTS

| 7,263,667 B1 | 8/2007 | Hoellerer et al. |
| 2013/0300740 A1 | 11/2013 | Snyder et al. |
| 2014/0244661 A1* | 8/2014 | Peiris ............... H04L 67/10 707/748 |
| 2015/0019342 A1 | 1/2015 | Gupta |

FOREIGN PATENT DOCUMENTS

| CN | 202976181 U | 6/2013 |
| CN | 103646557 A | 3/2014 |

OTHER PUBLICATIONS

Holstein, William J., "Virtual Singapore", Retrieved on: Feb. 21, 2016 Available at: http://compassmag.3ds.com/8/Cover-Story/VIRTUAL-SINGAPORE.

(Continued)

*Primary Examiner* — Anhtai V Tran
(74) *Attorney, Agent, or Firm* — Shook, Hardy & Bacon L.L.P.

(57) ABSTRACT

Methods and systems are provided for facilitating collaborative real-time data modeling. Data corresponding to a particular subject from a plurality of sources is collected. The sources include a first data source having data corresponding to a first user and a second data source having data corresponding to a second user. For the first user, a first intent of the first user associated with content that is to be provided to the first user is determined. From the collected data, data associated with the determined first intent of the first user is identified. Output content for communication to a user device corresponding to the first user is generated in a format corresponding to the identified data.

20 Claims, 6 Drawing Sheets

(56) References Cited

OTHER PUBLICATIONS

Humphlett, Mark., "Smart manufacturing technologies build intelligent processes", Published on: Mar. 31, 2014 Available at: http://www.controleng.com/single-article/smart-manufacturing-technologies-build-intelligent-processes/70c40aabbbf6f1f1379dc6f48f552029.html.

Brown, Sherry-Ann., "Building SuperModels: emerging patient avatars for use in precision and systems medicine", In Journal of Frontiers in Physiology, vol. 6, Article 318, Nov. 6, 2015, pp. 1-6.

"CyberLightning Charts Path to Intelligent Internet of Everything With New Release of CyberVille® Platform", Published on: Apr. 23, 2015 Available at: http://cyberlightning.com/blog/2015/04/23/cyberlightning-charts-path-to-intelligent-internet-of-everything-with-new-release-of-cyberville-platform/.

"Humanizing Big Data", A White Paper from CITO Research, Retrieved on: Feb. 21, 2016, pp. 1-8.

Wakefield, Jane., "Tomorrow's cities: How big data is changing the world", Published on: Aug. 27, 2013 Available at: http://www.bbc.com/news/technology-23253949.

Dungen, et al., "Hyperlocal Context to Facilitate an Internet of Things Understanding of the World", In the International Workshop on Identification, Information & Knowledge on the Internet of Things, Oct. 18, 2013, pp. 1-8.

Gubbi, et al., "Internet of Things (IoT): A Vision, Architectural Elements, and Future Directions", In Journal of Computing Research Repository, Jul. 2012, pp. 1-19.

* cited by examiner

COLLABORATIVE REAL-TIME DATA MODELING

BACKGROUND

In the recent past, much information is available to users on the web and from other sources. Because of the vast nature of this data, it can be daunting and frustrating for a user who has a specific intent in mind, but still is unable to use this information to make an informed decision. As such, while data from publicly available sources can be helpful to a user who wants to make a decision, there are several problems with simply conducting a web search and expecting one of the search results to assist in the decision making. The format of the search results may not always be the best way of presenting information to the user. Also, in many cases, the same decision has been made by many others, such as others in a particular field or industry. It is time consuming and labor intensive to start from scratch each time a user has a decision to make.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein are directed to utilizing data from a variety of sources to provide real-time collaborative data modeling. The Internet of Things (IoT) data layer enables users to use data from the cloud, their own knowledge graph, publicly available data, telemetry data, and data for other users to improve and streamline decision making processes. This is done by modeling solutions in, for example, a 3-D environment and by building end-to-end insights by vertical and person/archetype. As such, data may be continually collected by a variety of sources, such as those listed above. When a user's intent is determined, data can be identified specific to that intent and used to generate output content for presentation to the user. This content may be a 3-D representation, such as when the data and capabilities of the user device allow for such a representation, or may be a 2-D representation, such as content provided as part of search results, images, videos, etc. Aspects provide for collaboration among many users, such as users who work for the same company, users who work for different companies but are in the same line of business, or even users who have similar interests and who may benefit from combining their own data with data from others.

BRIEF DESCRIPTION OF THE DRAWINGS

Aspects of the technology described in the present application are described in detail below with reference to the attached drawing figures, wherein.

DETAILED DESCRIPTION

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects are directed toward collaborative, real-time data modeling that is personalized to a user and that user's intent at a particular moment of time. The goal of a hyper local IoT data layer is to enable users, such as professionals (e.g., builders, architects, biologists, engineers, etc.) to utilize data from the cloud, their knowledge graph, publicly available data (e.g., on land use, engineering theory, zoning/building regulations, current zoning laws), coupled with just in time hyper localized IoT telemetry data (e.g., traffic cameras, weather instrumentation, field and stream instrumentation, field instrumentations, sensors) to improve and streamline decision making processes by modeling solutions in an environment, such as a 3-D environment, and to build end-to-end insights by vertical and person/archetype. By proactively providing the users a 3-D environment from their own personal graph and layering in currently available public IoT data, users of this technology will be able to quickly and efficiently make informed decisions. This modeled data can then inform end-to-end decision making across a company or vertical as the inferences build. Ultimately, the data can drive individual personalization based on the learnings from "people like me" based on industry learnings and persona/archetype learnings for targeted personalization for 2-D/3-D environments across different third parties.

For exemplary purposes only, a builder can go to a new field site and use a camera to document the area via a panorama camera. This provides the GPS location, topography, and overall site data (e.g., sewer, septic, gas, electric). This data can be stored in the cloud and accessed in a 3-D environment. Within this 3-D environment, the data layers begin to take shape. All personal graph information and publicly available data regarding the site will be added to the 3-D rendering. This allows the system to know this user is a builder, and understand the user's intent. Within the 3-D environment, a dynamic picture of a site is created and suggests best in class materials and options for the user to parse to build a superior dwelling. The ability to model and review in 3-D allows the user to make best in class decisions. These decisions can be mined across users to build overall insights for a company/vertical/individual.

Additionally, IoT data, such as hyper local weather patterns and year-round humidity and moisture coupled with current zoning laws and directives may be added to the model. The builder may then be presented with proactive suggestions on the build site, including which type of lumber to use, how big the dwelling can be, what level of "walkability" and permeable surfaces will be required, etc. This data can also be coupled with content, such as advertising content, for items such as solar panel upgrades with links to government rebates as it fits with the user's model being examined and built. This allows the builder or architect to move and reshape the plan to devise the best solution based on overall goals (e.g., cost, dwelling size, re-sale value), and can potentially serve as an inroad to advertising as appropriate. Additionally, as the data layer is built for multiple employees across an industry, the data built and created in the 3-D environment can be shaped for "profession" specific data, as well as individual archetype data (e.g., people like me to XYZ).

While the example provided above is directed to a builder, many other professionals would benefit from this hyper local IoT data layer, including biologists working on dam or stream models to benefit the environment and inform public policy. Automotive engineers could use this to couple real-time feedback from cars in the field (IoT data) to review and update schematics in order to build superior automotives.

The system, according to aspects herein, may include a machine-learning perspective such that the system continually learns about the user and about what is best for a particular user in terms of types of data, format of the data as the output content, if advertisements are preferred, etc. For instance, machine learning, as used herein, uses algorithms to learn from and make predictions on data. Such algorithms operate by building a model from example inputs in order to make data-driven predictions or decisions expressed as outputs, rather than following strictly static program instructions.

According to a first aspect herein, a method for facilitating collaborative real-time data modeling is provided. The method includes collecting data corresponding to a particular subject from a plurality of sources. The plurality of sources comprises at least a first data source having data corresponding to a first user and at least a second data source having data corresponding to a second user. For the first user, the method includes determining a first intent of the first user associated with content that is to be provided to the first user and from the collected data, and identifying data associated with the determined first intent of the first user. The method also includes generating output content for communication to a user device corresponding to the first user in a format corresponding to the identified data.

According to a second aspect herein, a computing device comprising at least one processor and a computer storage memory having computer-executable instructions stored thereon is provided. The computer-executable instructions stored thereon, when executed by the at least one processor, configure the computing device to perform a method. The method includes gathering data from, at least, a user's knowledge graph, publicly available data, and at least a portion of at least one other user's data. Further, the method includes determining a current intent for the user. The intent represents a subject of interest and a type of information corresponding to the subject of interest in which the user may be interested. The method also includes identifying data from the gathered data corresponding to the current intent for the user and generating output content that comprises a 3-D model that represents the identified data corresponding to the current intent for the user. Additionally, the method includes communicating the output content for presentation on a user device associated with the user.

According to a third aspect herein, one or more computer storage hardware devices are provided having computer-executable instructions embodied thereon that, when executed, facilitate collaborative real-time data modeling. The method includes continually gathering data from two or more data sources. The two or more data sources provide data from two or more users regarding a particular subject. For a user, the method includes identifying a first user intent that includes a first topic and a first type of data that is to be provided to the user and from the continually gathered data, identifying data that is relevant to the first user intent, and generating a first output content for the first user intent using the identified data. Further, the method includes, for the user, identifying a second user intent that includes a second topic and a second type of information that is to be provided to the user, from the continually gathered data, identifying data that is relevant to the second user intent, and generating a second output content for the second user intent using the identified data.

Having briefly described an overview of aspects of the technology described herein, an exemplary operating environment suitable for use in implementing the technology is described below.

Exemplary Operating Environment

Figure 1:
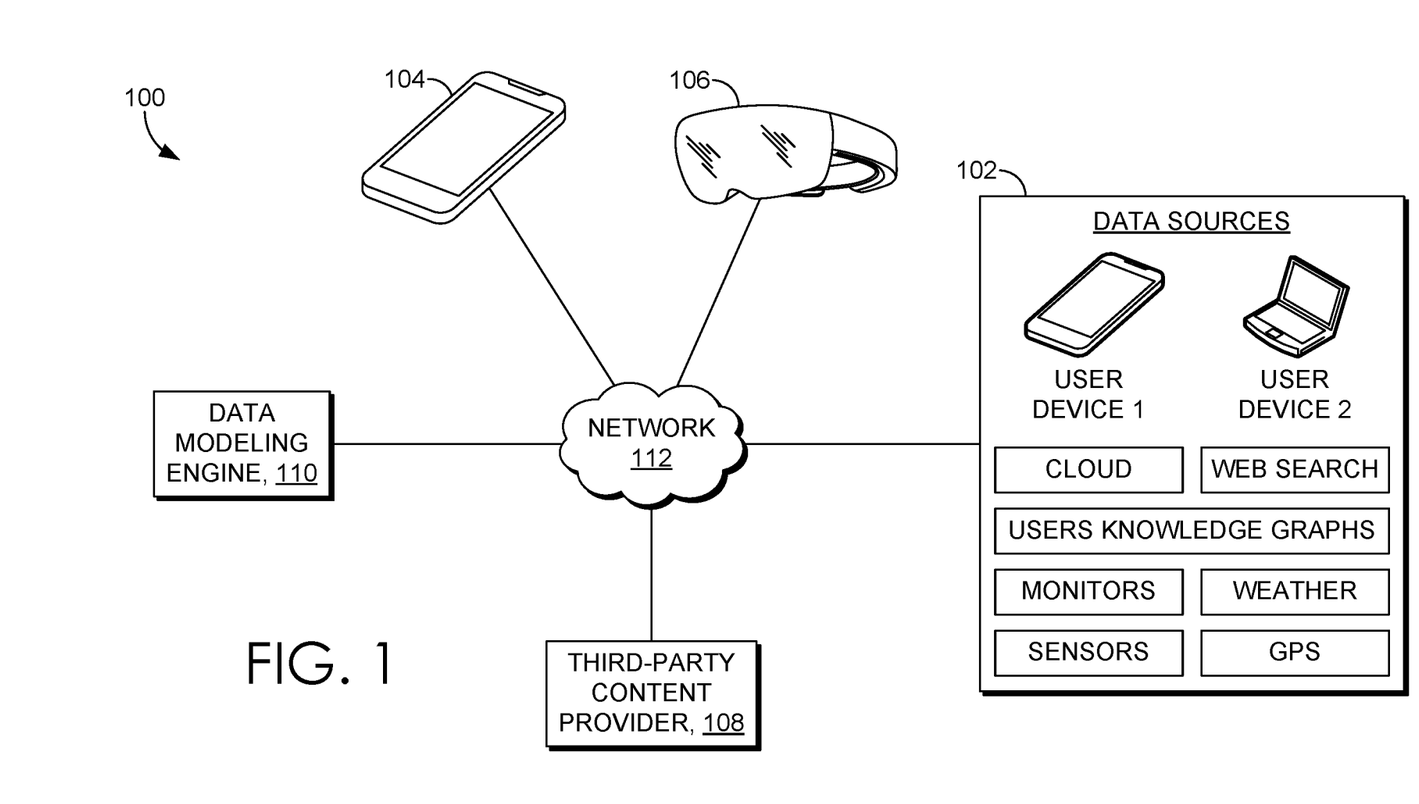
FIG. 1 is a block diagram of an exemplary computing environment suitable for implementing aspects of the technology described herein.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes data sources 102, a first user device 104, a second user device 106, a third-party content provider 108, and a data modeling engine 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 112, which may include, without limitation, one or more local area networks (LANs) and/or wide area networks (WANs). In exemplary implementations, network 112 comprises the Internet and/or a cellular network, amongst any of a variety of possible public and/or private networks.

User devices 104 and 106, as well as data sources 102, may be a device on the client side of operating environment 100, while the other components illustrated in FIG. 1 may be on the server side of operating environment 100.

User devices 104 and 106, as well as data sources 102, may comprise any type of computing device capable of use by a user. For example, in one aspect, user devices 104 or 106 may be the type of computing device 600 described in relation to FIG. 6 herein. By way of example and not limitation, a computing device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Each of user devices 104 and 106 comprises a display that allows for output, such as a 3-D model, search results, or other output in 2-D form, to be presented to the user of the computing devices.

Referring to data sources 102, exemplary data sources are illustrated that include, but are not limited to, the cloud, a web search, knowledge graphs associated with various users, monitors, sensors, weather, GPS, and data from user devices. Data may be collected from a wide variety of data sources, which may be particular to a specific subject for which the data is being collected. The data may be publicly available but taken from a wide variety of sources. In the case of a builder, for example, the data could include images or videos from the user device's camera, GPS data, topography, overall site data (e.g., sewer, septic, gas, electric), data in the cloud, and data from other users. This data may be compiled and presented to the user in the most relevant way, such as based on the user's intent at that particular moment in time. The builder, at one moment in time, may be debating on which type of material to use for a building, which could be based on weather information, what others in that area are using, local city/county laws on building materials, etc. At a different moment in time, however, the builder may be focused on solar panels for a home. The data could also include weather information, and local city/county laws on the use of solar panels, but may also include information from local vendors/manufacturers of solar panels, reviews from others who have used those solar panels, images and commentary from other builders who have made similar decisions, etc.

Operating environment 100 also includes a third-party content provider 108. It will be appreciated that many third-party content providers may actually be involved in a system such as operating environment 100, but just one third-party content provider is illustrated for exemplary purposes in FIG. 1. The third-party content provider 108, for example, may be alerted when there is a need for a particular type of content (e.g., advertisement), such as retrieving content in real time, to be included in output provided to a user based on the user's intent. Alternatively, content may be retrieved in advance so that it is ready to be included in output for a user. In one embodiment, content is an advertisement. For example, if a builder's intent is to select between multiple types of heating mechanisms, one or more advertisements may be included in the output for the user. Or multiple advertisements for the same type of heating mechanism may be included in the output so that the builder can easily see if any are on sale at that time and choose accordingly.

Data modeling engine 110 is generally responsible for taking relevant data, based on the user intent, from the data sources 102 and determining a format in which the data should be presented to provide the data in the most effective way. Many factors may be considered when determining which format is best. For example, the type/capabilities of the user's computing device, the purpose of providing the output, the nature of the data, etc., may be used by the system to determine the best format to use for presenting the information to the user. Some user devices may have the capability for 3-D viewing, such as by devices capable of providing 3-D content, but others may not. While the term "3-D representation" used herein, this term includes holograms and encompasses embodiments where holograms of objects are provided. In exemplary embodiments, the user devices 104 and 106 include Hololens® technology, offered by Microsoft Corporation of Redmond, Wash., Oculus VR® technology, offered by Samsung Electronics®, or other virtual reality technology. If the data to be provided to the user is best viewed in 3-D format and the user's device has 3-D viewing capabilities, the system may make a determination to provide content in 3-D format. Further, the user intent at a particular moment in time could dictate the format in which the output is provided.

A "3-D representation," (or 3-D content) as the term is utilized herein, refers to an electronic rendering that approximates an actual or imagined real world object in a plurality of qualities (e.g., shape, color, dimension, proportion, and the like) that make the representation visually appear like an image of a real world object (e.g., a 3-D model). A "2-D representation" or content, as used herein, refers generally to any representation in two-dimensions (for instance, a sketch, drawing, or photograph). Such 2-D representations include text-based content. In exemplary embodiments, a hologram (i.e., an object representation that is produced by a split laser beam and that appears to be three-dimensional) representing an object may be provided as an exemplary 3-D representation.

Figure 2:
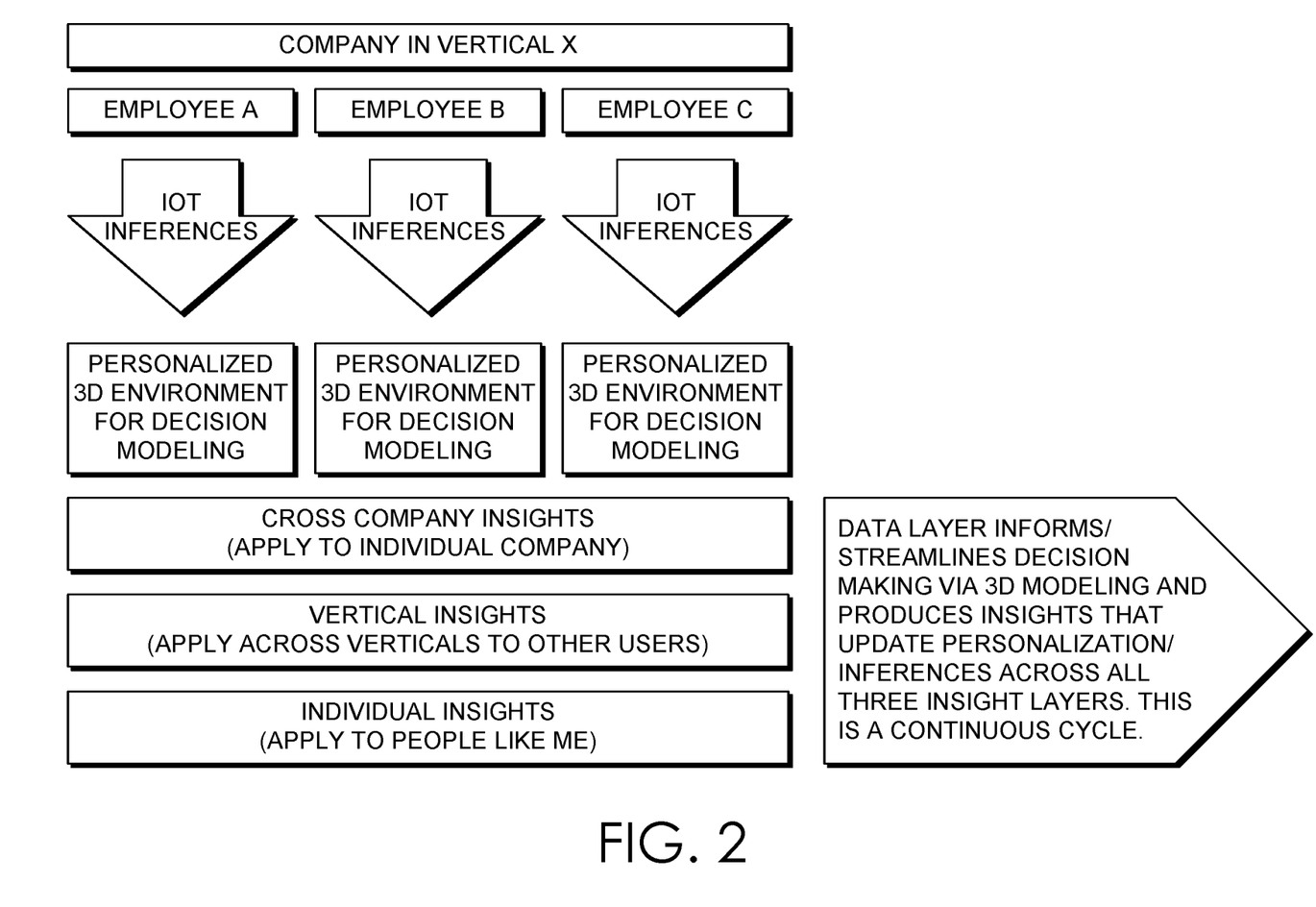
FIG. 2 is a block diagram of an exemplary process used to facilitate collaborative real-time data modeling, in accordance with an aspect of the technology described herein.

Turning to FIG. 2, a block diagram 200 is provided of an exemplary process used to facilitate collaborative real-time data modeling, in accordance with an aspect of the technology described herein. FIG. 2 illustrates different examples of how collaboration among various users can assist to generate a more comprehensive output for a user. FIG. 2 is provided as one exemplary embodiment, and should not be construed as being limiting in any way. In the embodiment of FIG. 2, three employees, employee A, employee B, and employee C, are illustrated. To illustrate an example of this, in one aspect, the three employees may work at a building company, with each of the three employees having different jobs at different job sites. Data may be retrieved for that particular user/employee and for others as well as from a variety of sources, including data from the Internet of Things (IoT). As used herein, IoT refers to the network of physical objects—devices, vehicles, buildings, and other items—embedded with electronics, software, sensors, and network connectivity that enables these objects to collect and exchange data. Each employee may be able to get a personalized model environment based on IoT and other inferences. For example, each time the builder builds a structure in a particular location, the builder may be provided with building materials that have been used in the past and that are superior for particular weather conditions.

This data is pulled into an individual's personalized 3-D environment for decision modeling. In the personalized 3-D environment for each user, cross company insights may be applied for the particular company at which the employees are employed. Vertical insights may also be applied across verticals to other users. Individual insights could also be employed, either alternatively or in combination with the other insights mentioned herein. Individual insights, as used herein, could pull in data from other people similar to the user, such as others who are in the same work field, who work for similar companies, who have similar job titles, who have similar interests, live in the same or similar location, etc. Similarly, a builder could be provided with information on solar panels, such as if the solar panels are purchased now, a rebate will be provided. This type of content could be provided by a third-party content provider. In this way, insights are provided from people across a particular company.

In other embodiments, such as those now shown in FIG. 2, the employees could work for different companies. For example, for any company that is a building/architect company, this collaborative data modeling could provide them with insights to build a better model. Even still, in another embodiment, instead of looking at others within a company or within an industry, insights could be pulled in from other people who have similar interests and other similarities when compared to the user (e.g., people like me).

In aspects, a machine-learning algorithm is used to learn patterns of behavior of users and data. For instance, the algorithm may learn that a certain building material is commonly used in certain weather conditions or in a certain location, or because of a cost restriction. This assists in providing the best model of the gathered data. Additionally, and as mentioned, hyper-local data, such as data from other employees of a company, GPS information from a user device, monitors/sensors on a user's device, weather and trends for different years, information from municipalities/cities/counties, and third-party content (e.g., advertisements), can be combined to determine costs for a project and the best way to carry out the project. Additionally, a web search can be performed to access easily accessible publicly available information. One or more web crawls could be performed to gather this data.

In some instances, hardware can be used to capture data. For instance, devices that capture sound can be used to determine the average sound in a neighborhood. This could assist a builder or developer in determining that a particular neighborhood is too loud for a particular use. Or the builder could decide to build in that neighborhood, but to use more insulation than normal.

Figure 3:
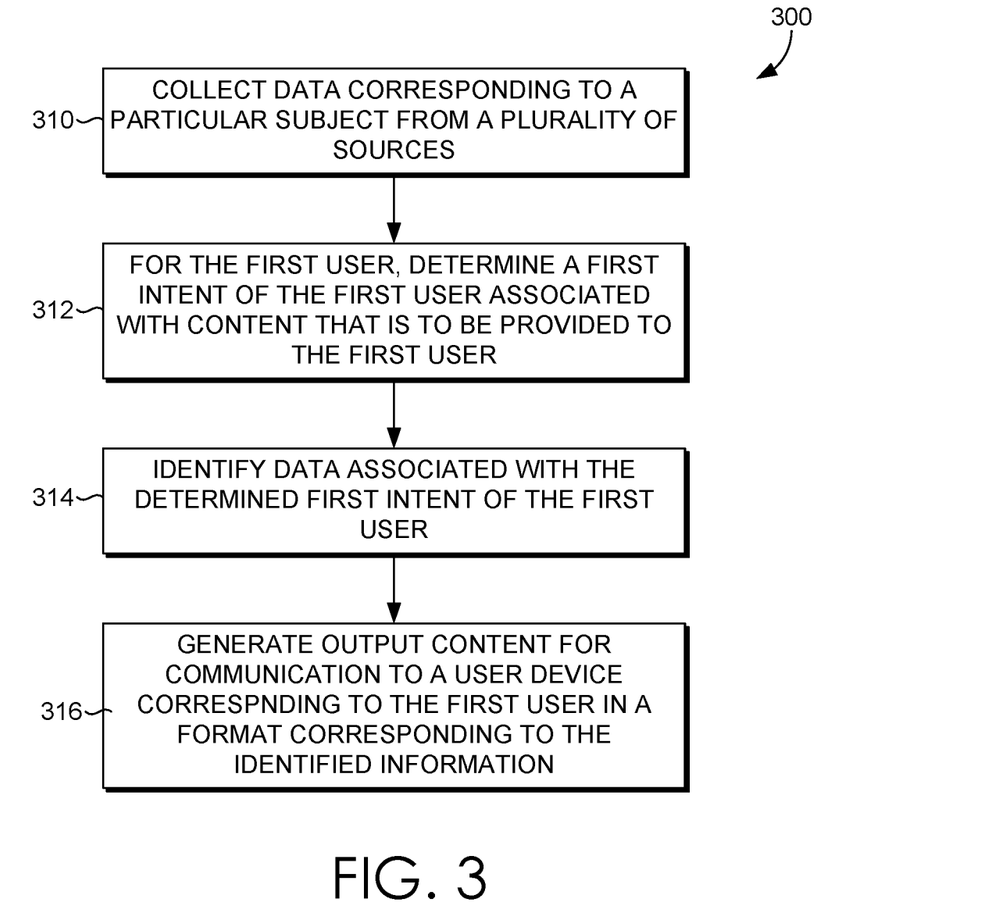
FIG. 3 is a flow diagram depicting a method for facilitating collaborative real-time data modeling, in accordance with an aspect of the technology described herein.

FIG. 3 is a flow diagram depicting a method 300 for facilitating collaborative real-time data modeling, in accordance with an aspect of the technology described herein. Initially, at block 310, data is collected that corresponds to a particular subject from a plurality of sources. In embodiments, data may be continually collected so that the gathered data is current at all times. The sources may comprise at least one data source having data corresponding to a first user and another data source having data corresponding to a second user, such that the data comes from more than one user. There are several variations as to how the first and second users may be related. In one aspect, the first and second users are employed by the same entity, such as the same company. In another aspect, the first and second users are employed by different entities but may have something in common, such as having at least one common interest or working in the same industry. Still, in another aspect, the first and second users may not work for the same company but may share the same or similar job title, and as such may perform the same duties at work.

In aspects, data may be pulled from a large number of different users. This could depend, for example, on the sources of data, such as whether data is being pulled from within a single company, from multiple companies, or from users who have similar job titles, interests, etc., to the user to whom the content will be provided. To illustrate, by way of an example, if the particular subject is building a structure that is up to code in a particular municipality, data sources could include data from the municipality on codes (e.g., maximum height of fences, walls, and buildings; allowable building materials; width of sidewalk; etc.), or from other users, whether from the same company or not, who have built similar structures. Additional data sources could include weather information for that region.

At block 312, a first intent of the first user is determined, where the first intent is associated with content that is to be provided to the first user. At block 314, data is identified from the data collected at block 310 that is associated with the determined first intent of the first user. Output content is then generated at block 316 for communication to a user device corresponding to the first user. The output content is formatted to correspond to the identified data. For example, some types/forms of data may be best presented as a 3-D representation, while other types/forms of data may be best presented as a 2-D representation, such as search results, images, or just text. The type of format may also be based on the type of user device, such as whether the user device is capable of presenting data that is viewable to a user as a 3-D representation. As such, in one aspect, the format is a 3-D representation and is communicated for presentation on a user device that allows for 3-D viewing. For example, the output content may be a personalized 3-D environment for decision modeling.

In embodiments, a second intent of the user is determined, where the second intent is associated with information that is to be provided to the user in the form of, for example, a 3-D representation or 2-D representation (e.g., text). From the collected data, such as data that has been continually collected from a variety of sources, information is identified that is associated with the second intent of the user. The information from the data sources, in one embodiment, corresponds to data from at least two different users. Based on the second intent, output content is generated for communication to the user in a format corresponding to the identified data.

User intent may vary slightly or even dramatically at different moments of time because of a different focus of a project, new information being required by the user, etc. As such, the first user intent refers to the user's current intent at a first moment of time, the second user intent refers to the user's current intent at a second moment of time, and so on. These moments of time could be seconds or minutes apart, or could be hours, days, weeks, or years apart in time.

Figure 4:
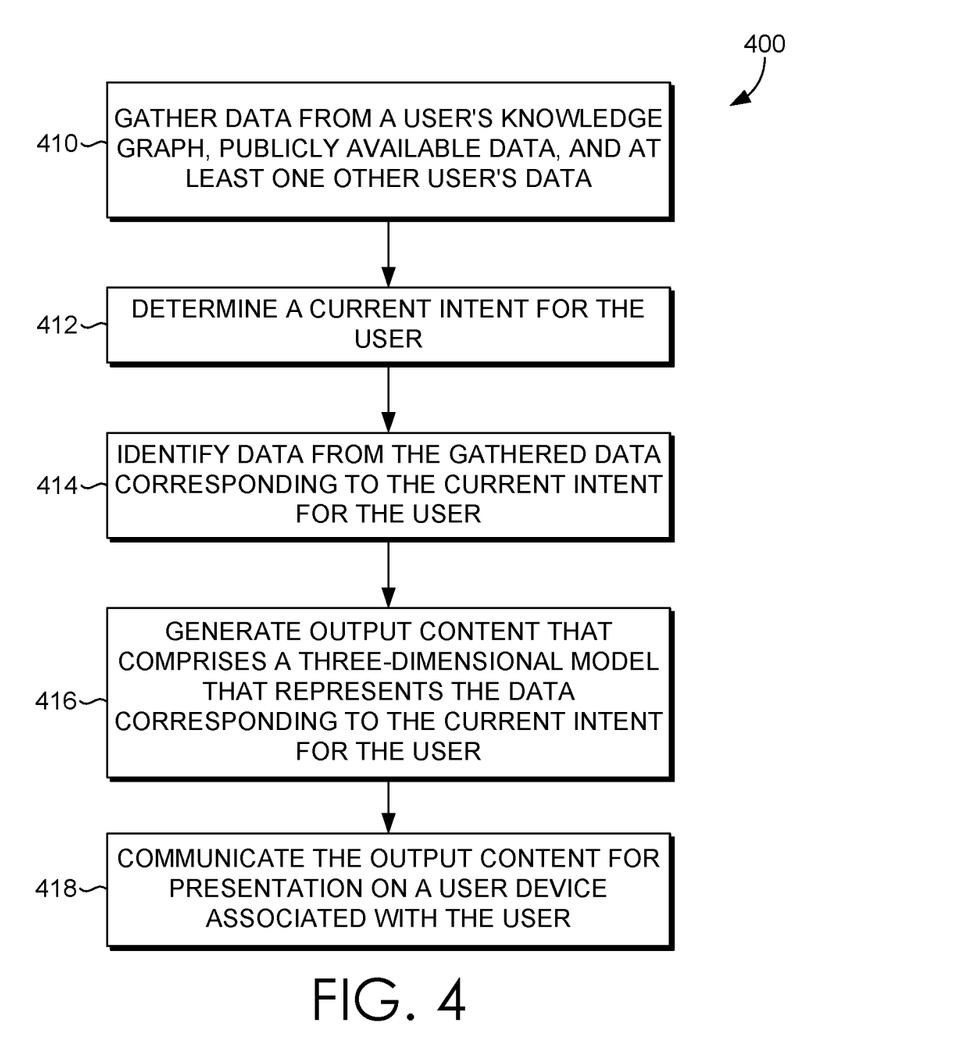
FIG. 4 is a flow diagram depicting another method for facilitating collaborative real-time data modeling, in accordance with an aspect of the technology described herein.

Referring now to FIG. 4, a flow diagram is depicted of another method for facilitating collaborative real-time data modeling, in accordance with an aspect of the technology described herein. At block 410, data is gathered from, at least, a user's knowledge graph, publicly available data, and data from at least one other user. This allows for the gathered data to be collaborative. This data, in one aspect, may continually be updated, such that the output content, both the data itself and the format, can be dynamically modified at any time. At block 412, a current intent for the user is determined. The intent represents a subject of interest and a type of information corresponding to the subject of interest in which the user may be interested. At block 414, data is identified from the data gathered at block 410. The identified data corresponds to the current intent of the user. At block 416, output content is generated that comprises a 3-D model, representing the identified data corresponding to the current intent for the user. At block 418, the output content is communicated for presentation on a user device associated with the user.

Figure 5:
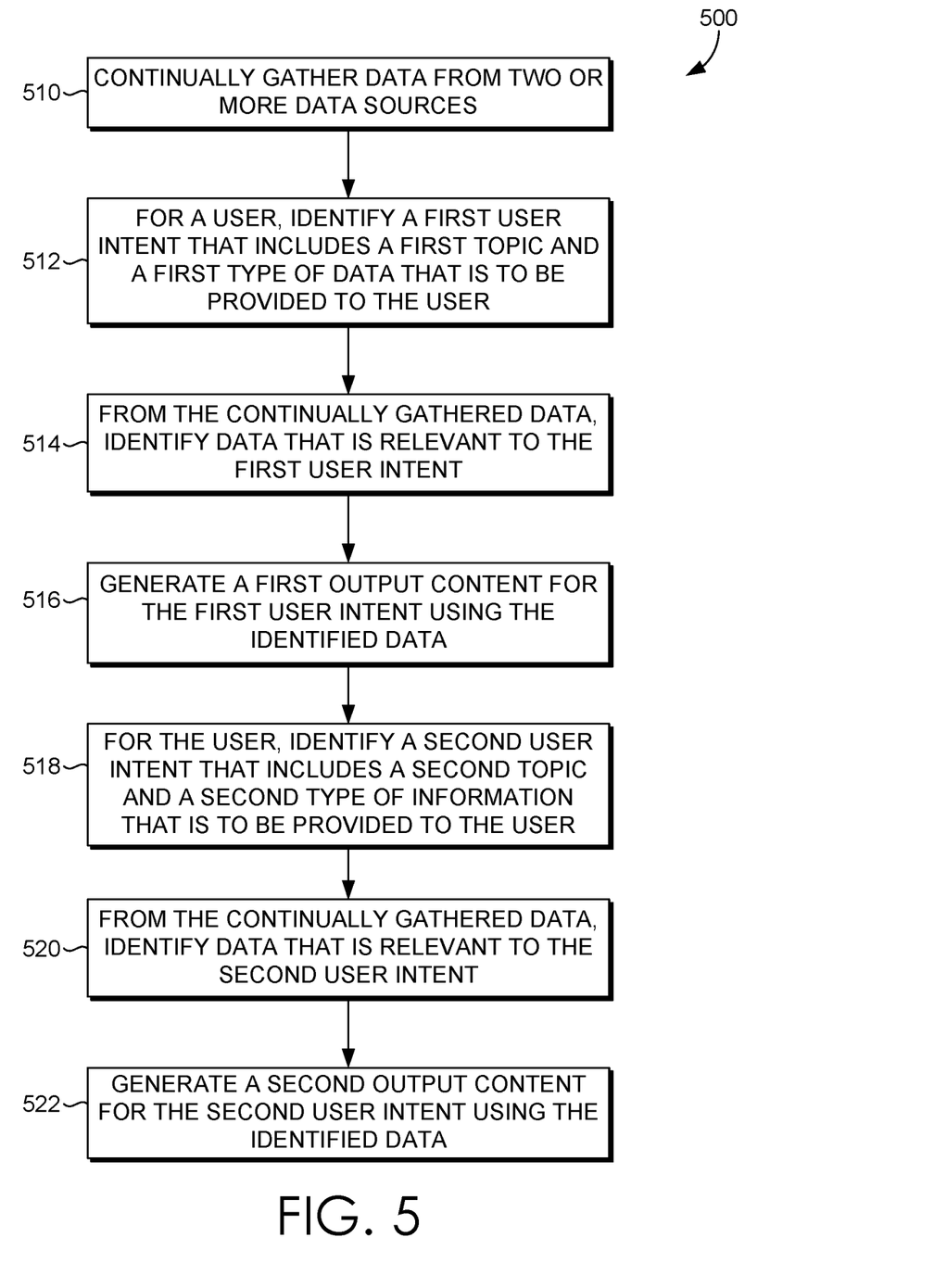
FIG. 5 is a flow diagram depicting another method for facilitating collaborative real-time data modeling, in accordance with an aspect of the technology described herein.

Turning now to FIG. 5, a flow diagram is depicted of another method 500 for facilitating collaborative real-time data modeling, in accordance with an aspect of the technology described herein. At block 510, data is continually gathered from multiple data sources, where these data sources provide data from two or more users regarding a particular subject. In embodiments, data is gathered for many subjects, and then may be parsed for individual subjects. At block 512, a first user intent, including a first topic and a first type of data that is to be provided to a user, is identified for a user. From the data continually gathered at block 510, data is identified at block 514 that is relevant to the first user intent. At block 516, a first output content is generated, where the content is generated for the first user intent using the identified data. In embodiments, the first user intent is determined for a first moment in time such that the user intent may periodically change and be modified by the system.

At block 518, a second user intent, including a second topic and a second type of information that is to be provided to the user, is identified for the user. At block 520, from the data that is continually gathered at block 510, data relevant to the second user intent is identified. At block 522, a second output content for the second user intent is generated using the identified data. As mentioned, as the first user intent is the user's current intent at a first moment of time, the second user intent is the user's current intent at a second moment of time. To illustrate how a user's intent can change in different moments of time, a third user intent, including a third topic and a third type of information to be provided to the user, may be identified. From the continually gathered data from block 510, data is identified that is relevant to the third user intent. A third output content is generated for the third user intent using the identified data. The third user intent is the user's current intent at a third moment of time.

In embodiments, the first or second output content could comprise a 3-D representation of the identified data, or could be represented in 2-D. As mentioned, the format of the content provided to a user device associated with the user may vary based on the viewing/displaying capabilities of the user device, or on the data identified as being relevant to the user's current intent.

Figure 6:
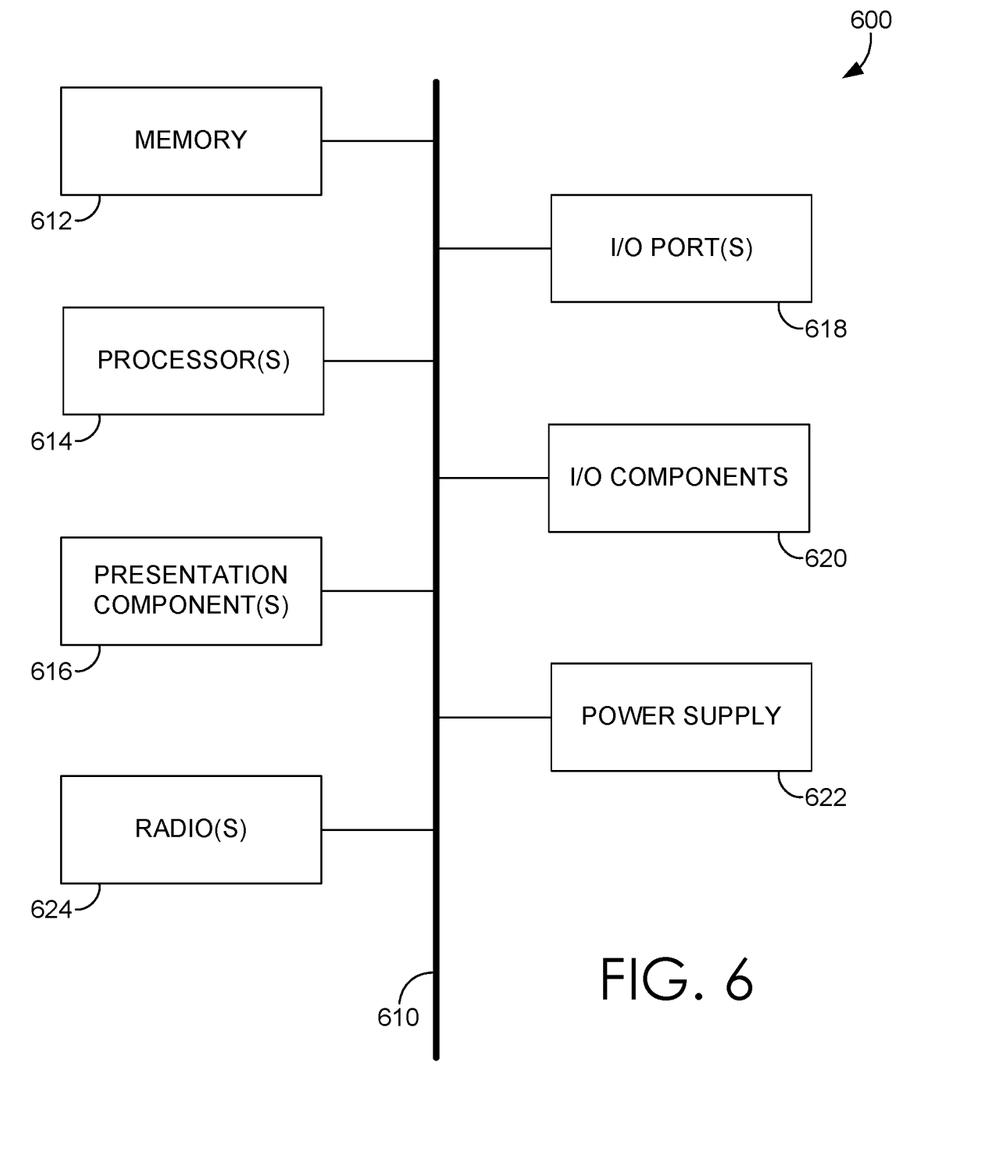
FIG. 6 is a block diagram of an exemplary computing environment suitable for implementing aspects of the technology described herein.

Referring now to FIG. 6, an exemplary operating environment for implementing aspects of the technology described herein is shown and designated generally as computing device 600. Computing device 600 is just one example of a suitable computing environment and is not intended to suggest any limitation as to the scope of use of the technology described herein. Neither should the computing device 600 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 6 and refer to "computer" or "computing device." The computing device 600 may be a PC, a tablet, a smartphone, virtual reality headwear, augmented reality headwear, a game console, and such.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, vibrating component, etc. I/O ports 618 allow computing device 600 to be logically coupled to other devices, including I/O components 620, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 600. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

The computing device 600 may include a radio 624. The radio transmits and receives radio communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

EMBODIMENTS SECTION

Embodiment 1

A method for facilitating collaborative real-time data modeling, the method comprising: collecting data corresponding to a particular subject from a plurality of sources, wherein the plurality of sources comprises at least a first data source having data corresponding to a first user and at least a second data source having data corresponding to a second user; for the first user, determining a first intent of the first user associated with content that is to be provided to the first user; from the collected data, identifying data associated with the determined first intent of the first user; and generating output content for communication to a user device corresponding to the first user in a format corresponding to the identified data.

Embodiment 2

The method of Embodiment 1, further comprising continuing to collect data corresponding to the particular subject from the plurality of sources.

Embodiment 3

The method of any of the above Embodiments, further comprising: determining a second intent of the first user associated with information that is to be provided to the first user; from the collected data, identifying the information associated with the determined second intent of the first user, the information from the at least two or more data sources each corresponding to at least two different users; based on the determined second intent, generating output content for communication to a user device corresponding to the first user in a format corresponding to the identified information.

Embodiment 4

The method of Embodiment 3, wherein the first intent is the first user's current intent at a first moment of time, and wherein the second intent is the first user's current intent at a second moment of time.

Embodiment 5

The method of any of the above Embodiments, wherein the format is three-dimensional and is communicated for presentation on a device that allows for three-dimensional viewing.

Embodiment 6

The method of any of the above Embodiments, wherein the first user and the second user are employed by a same entity.

Embodiment 7

The method of any of the above Embodiments, wherein the first user and the second user are employed by different entities.

Embodiment 8

The method of any of the above Embodiments, wherein the first user and the second user have similar interests or work in the same industry.

Embodiment 9

The method of any of the above Embodiments, wherein the output content is a personalized three-dimensional environment for decision modeling.

Embodiment 10

The method of Embodiment 2, wherein the output content is continually updated based on the continually collected data.

Embodiment 11

The method of any of the above Embodiments, wherein the output content is communicated for presentation on a search results page.

Embodiment 12

The method of Embodiment 2, wherein the output content comprising the identified data and the format of the identified data is dynamically modified when new data corresponding to the particular subject is collected.

Embodiment 13

A computing device comprising: at least one processor; and a computer storage memory having computer-executable instructions stored thereon which, when executed by the at least one processor, configure the computing device to: gather data from, at least, a user's knowledge graph, publicly available data, and at least a portion of at least one other user's data; determine a current intent for the user, wherein the intent represents a subject of interest and a type of information corresponding to the subject of interest in which the user may be interested; identify data from the gathered data corresponding to the current intent for the user; generate output content that comprises a three-dimensional model that represents the identified data corresponding to the current intent for the user; and communicate the output content for presentation on a user device associated with the user.

Embodiment 14

The computing device of Embodiment 13, wherein the computing device is further configured to continue to collect data corresponding to, at least, the user's knowledge graph, the publically available data, and the at least the portion of at least one other user's data.

Embodiment 15

The computing device of any of Embodiments 13 or 14, wherein the computing device is further configured to modify the three-dimensional model and the data corresponding to the current intent for the user when new information corresponding to the subject of interest becomes available.

Embodiment 16

One or more computer storage hardware devices having computer-executable instructions embodied thereon that, when executed, facilitate collaborative real-time data modeling, the method comprising: continually gathering data from two or more data sources, the two or more data sources providing data from two or more users regarding a particular subject; for a user, identifying a first user intent that includes a first topic and a first type of data that is to be provided to the user; from the continually gathered data, identifying data that is relevant to the first user intent; generating a first output content for the first user intent using the identified data; for the user, identifying a second user intent that includes a second topic and a second type of information that is to be provided to the user; from the continually gathered data, identifying data that is relevant to the second user intent; and generating a second output content for the second user intent using the identified data.

Embodiment 17

The one or more computer storage hardware devices of Embodiment 16, wherein the first user intent is the user's current intent at a first moment of time, and wherein the second user intent is the user's current intent at a second moment of time.

Embodiment 18

The one or more computer storage hardware devices of any of Embodiments 16 or 17, the method further comprising, for the user, identifying a third user intent that includes a third topic and a third type of information that is to be provided to the user; from the continually gathered data, identifying data that is relevant to the third user intent; and generating a third output content for the third user intent using the identified data.

Embodiment 19

The one or more computer storage hardware devices of Embodiment 18, wherein the third user intent is the user's current intent at a third moment of time.

Embodiment 20

The one or more computer storage hardware devices Embodiments 16-19, wherein a format of the output is three-dimensional and is communicated for presentation on a device that allows for three-dimensional viewing.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A method for facilitating collaborative real-time data modeling, the method comprising:
    collecting data corresponding to a particular subject from a plurality of sources, wherein the plurality of sources comprises at least a first data source having data corresponding to a first user and at least a second data source having data corresponding to a second user;

for the first user, determining a first intent of the first user, wherein the first intent corresponds to content that is to be provided to the first user;

from the collected data, identifying data associated with the determined first intent of the first user, wherein the identified data comprises the data corresponding to the second user from the second data source;

for the second user, determining a second intent of the second user, wherein the second intent corresponds to content that is to be provided to the second user;

from the collected data, identifying data associated with the determined second intent of the second user, wherein the identified data comprises the data corresponding to the second user from the second data source; and generating output content for communication to a user device corresponding to the first user in a format corresponding to the identified data wherein the output content represents the identified data corresponding to the first intent for the first user and the second intent for the second user.

2. The method of claim 1, further comprising continuing to collect data corresponding to the particular subject from the plurality of sources.

3. The method of claim 2, further comprising:
determining a second intent of the first user associated with information that is to be provided to the first user;
from the collected data, identifying the information associated with the determined second intent of the first user, the information from the at least two or more data sources each corresponding to at least two different users; and
based on the determined second intent, generating output content for communication to a user device corresponding to the first user in a format corresponding to the identified information.

4. The method of claim 3, wherein the first intent is the first user's current intent at a first moment of time, and wherein the second intent is the first user's current intent at a second moment of time.

5. The method of claim 1, wherein the format is three-dimensional and is communicated for presentation on a device that allows for three-dimensional viewing.

6. The method of claim 1, wherein the first user and the second user are employed by a same entity.

7. The method of claim 1, wherein the first user and the second user are employed by different entities.

8. The method of claim 1, wherein the first user and the second user have similar interests or work in the same industry.

9. The method of claim 1, wherein the output content is a personalized three-dimensional environment for decision modeling.

10. The method of claim 2, wherein the output content is continually updated based on the continually collected data.

11. The method of claim 1, wherein the output content is communicated for presentation on a search results page.

12. The method of claim 2, wherein the output content comprising the identified data and the format of the identified data is dynamically modified when new data corresponding to the particular subject is collected.

13. A computing device comprising:
at least one processor; and
a computer storage memory having computer-executable instructions stored thereon which, when executed by the at least one processor, configure the computing device to:
gather data from, at least, a user's knowledge graph, publicly available data, and at least a portion of at least one other user's data;
determine a current intent for the user, wherein the intent represents a subject of interest and a type of information corresponding to the subject of interest in which the user may be interested;
identify data from the gathered data corresponding to the current intent for the user, wherein the identified data comprises the data corresponding to the at least the one other user's data;
determine a second current intent for the at least one other user, wherein the second intent represents a subject of interest and a type of information corresponding to the subject of interest in which the at least one other user may be interested;
identify data from the gathered data corresponding to the second current intent for the at least one other user, wherein the identified data comprises the data corresponding to the at least one other user's data source;
generate output content that comprises a three-dimensional model that represents the identified data corresponding to the current intent for the user and the current second intent for the at least one other user; and
communicate the output content for presentation on a user device associated with the user.

14. The computing device of claim 13, wherein the computing device is further configured to continue to collect data corresponding to, at least, the user's knowledge graph, the publicly available data, and the at least a portion of at least one other user's data.

15. The computing device of claim 14, wherein the computing device is further configured to modify the three-dimensional model and the data corresponding to the current intent for the user when new information corresponding to the subject of interest becomes available.

16. One or more computer storage hardware devices having computer-executable instructions embodied thereon that, when executed, facilitate collaborative real-time data modeling, the method comprising:
continually gathering data from two or more data sources, the two or more data sources providing data from two or more users regarding a particular subject;
for a user, identifying a first user intent that includes a first topic and a first type of data that is to be provided to the user;
from the continually gathered data, identifying data that is relevant to the first user intent, wherein the identified data comprises the data corresponding to a second user of the two or more users regarding the particular subject;
generating a first output content for the first user intent using the identified data;
for the user, identifying a second user intent that includes a second topic and a second type of information that is to be provided to the user;
from the continually gathered data, identifying data that is relevant to the second user intent; and
generating a second output content for the second user intent using the identified data;
for the second user, identifying a third user intent that includes a third topic and a third type of information that is to be provided to the second user;
from the continually gathered data, identifying data that is relevant to third user intent; and generating a third output content for the third user intent using the identified data wherein the third output content is provided to the user.

17. The one or more computer storage hardware devices of claim 16, wherein the first user intent is the user's current intent at a first moment of time, and wherein the second user intent is the user's current intent at a second moment of time.

18. The one or more computer storage hardware devices of claim 16, the method further comprising:
  for the user, identifying a third user intent that includes a third topic and a third type of information that is to be provided to the user;
  from the continually gathered data, identifying data that is relevant to the third user intent; and
  generating a third output content for the third user intent using the identified data.

19. The one or more computer storage hardware devices of claim 18, wherein the third user intent is the user's current intent at a third moment of time.

20. The one or more computer storage hardware devices of claim 16, wherein a format of the output is three-dimensional and is communicated for presentation on a device that allows for three-dimensional viewing.

* * * * *